United States Patent [19]

Matui

[11] Patent Number: 6,134,280

[45] Date of Patent: Oct. 17, 2000

[54] DELAYED DECISION FEEDBACK SEQUENCE ESTIMATOR FOR DETERMINING OPTIMAL ESTIMATION REGION WITH SMALL CALCULATION QUANTITY

[75] Inventor: Hitoshi Matui, Tokyo, Japan

[73] Assignee: NEC Corporation, Tokyo, Japan

[21] Appl. No.: 09/098,093

[22] Filed: Jun. 16, 1998

[30] Foreign Application Priority Data

Jun. 16, 1997 [JP] Japan ..................................... 9-158172

[51] Int. Cl.[7] ...................................................... H03D 1/00
[52] U.S. Cl. ........................................... 375/341; 375/354
[58] Field of Search ..................................... 375/316, 340, 375/341, 346, 354–355, 358, 229, 233, 259, 262, 285; 371/43.6, 43.7; 714/794; 329/304, 318, 319, 349, 353

[56] References Cited

U.S. PATENT DOCUMENTS

| 4,484,338 | 11/1984 | Clark et al. | 375/341 |
| 4,788,697 | 11/1988 | Bell et al. | 375/364 |
| 5,093,842 | 3/1992 | Gimlin et al. | 375/227 |
| 5,602,507 | 2/1997 | Suzuki | 329/304 |
| 5,648,991 | 7/1997 | Namekata et al. | 375/341 |
| 5,673,294 | 9/1997 | Namekata | 375/341 |
| 5,822,143 | 10/1998 | Cloke et al. | 360/65 |
| 5,835,541 | 11/1998 | Namekata et al. | 375/355 |
| 5,903,610 | 3/1999 | Sköld et al. | 375/285 |

FOREIGN PATENT DOCUMENTS

5292138  5/1993  Japan .
5292139  5/1993  Japan .

OTHER PUBLICATIONS

IEEE Transactions on Communications; Delayed Decision–Feedback Sequence Estimation, vol. 37, No. 5., May 1989 pp. 428–436.

NEC Research & Development; *Delayed Decision Feedback Sequence Estimator for GMSK Wireless ATM Modem*, vol. 38, No. 1, Jan. 1997, pp. 73–80.

*Primary Examiner*—Stephen Chin
*Assistant Examiner*—Lenny Jiang
*Attorney, Agent, or Firm*—Ostrolenk, Faber, Gerb & Soffen, LLP

[57] ABSTRACT

In a delayed decision feedback sequence estimating apparatus, a transmission channel characteristic is detected for a training signal. A timing detecting unit detects when there is obtained a maximum of ratios of a summation value of absolute values of amplitude components of the transmission channel characteristic for a maximum likelihood sequence estimation region to an addition of a value obtained by multiplying, by a predetermined value, a summation value of absolute values of amplitude components of the transmission channel characteristic for a decision feedback equalization region and a summation value of absolute values of amplitude components of the transmission channel characteristic for a region other than the maximum likelihood sequence estimation region and the decision feedback equalization region, as an out-of-estimation region, to generate a timing signal. A delayed decision feedback sequence estimating unit executes an estimation of an inputted reception signal with a transmission distortion based on the transmission channel characteristic and the timing signal to output a transmission signal.

18 Claims, 13 Drawing Sheets

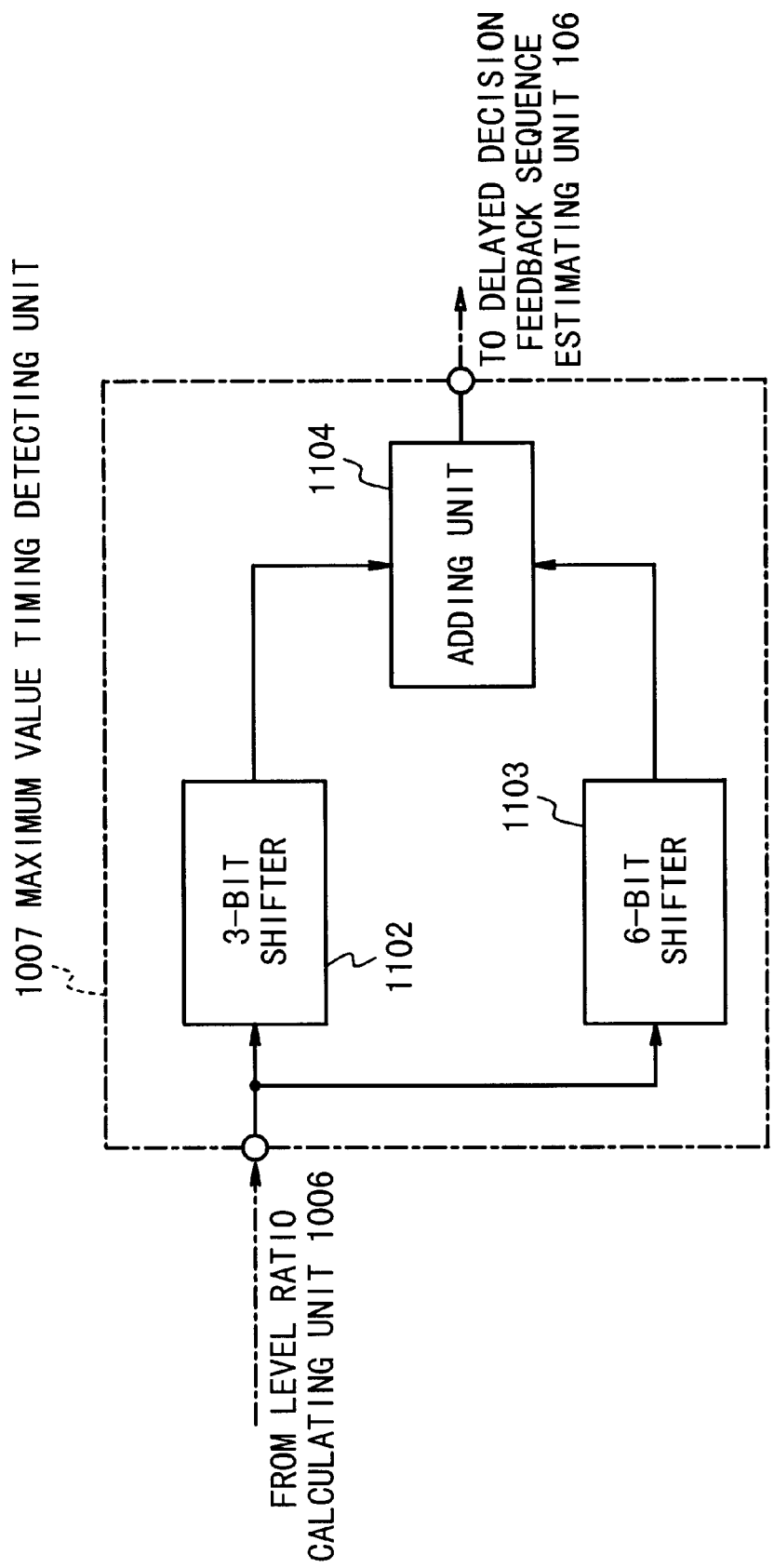

DELAYED DECISION FEEDBACK SEQUENCE ESTIMATOR FOR DETERMINING OPTIMAL ESTIMATION REGION WITH SMALL CALCULATION QUANTITY

BACKGROUND OF THE INVENTION

1. Field of the Invention

The present invention relates to a delayed decision feedback sequence estimating and receiving apparatus for selecting an optimum region from an impulse response sequence of a transmission channel distortion to estimate a transmission signal. More particularly, the present invention relates to a delayed decision feedback sequence estimating and receiving apparatus for estimating a transmission signal from a signal containing transmission channel distortion caused due to a frequency selective fading phenomenon which occurs in multi-path propagation in a high speed digital communication system, for example, in a wireless communication channel in a digital mobile telephone system.

2. Description of the Related Art

Conventionally, "MAXIMUM LIKELIHOOD SEQUENCE ESTIMATING AND RECEIVING APPARATUS" described in Japanese Laid Open Patent Disclosures (JP-A-Heisei 5-292138 and JP-A-Heisei 5-292139) is well known as a signal estimating system in which a transmission signal is estimated while an optimum region is selected from a sequence of pulses of an impulse response representing a transmission path distortion.

FIG. 1 is a schematic block diagram for illustrating the structure of such a conventional maximum likelihood sequence estimator. Referring to FIG. 1, the conventional maximum likelihood sequence is composed of a matching filter 2, a state estimator 3, a coefficient setting unit 4, an estimating unit 5, a signal generating unit 6 and a position estimating unit 7.

In this conventional maximum likelihood sequence estimator, each of the tap coefficients of the matching filter 2 is applied based on a sequence of pulses of an impulse response of a reception signal received through a transmission channel. The state estimator 3 has the largest processing amount. Therefore, to suppress the processing amount of the state estimator 3, the number of taps of the matching filter 2 must be suppressed to a minimum amount. When the number of taps is reduced, only a partial region of the sequence of pulses of the impulse response can be processed.

As a result, the following determination is required. That is, the highest estimation capability may be achieved when any one of the regions for the sequence of pulses of the impulse response should be processed by using what tap coefficients. This determination of an estimation region is carried out by the maximum likelihood sequence estimator shown in FIG. 1. First, when a training signal is received, the signal generating unit 6 generates the same signal as the training signal provided from a transmission side, and supplies the same signal to the estimating unit 5. Thus, the impulse response of the transmission channel is calculated by the estimating unit 5.

FIG. 2 schematically illustrates a sequence of pulses of an impulse response. When the sequence of pulses of the impulse response shown in FIG. 2 are acquired, the pulse amplitude values are compared with each other by the position estimating unit 7 shown in FIG. 1. Then, these pulse amplitude values are respectively allocated with pulse numbers from the smallest number in the order of larger pulse amplitude value. As the optimum signal estimation region is recognized the region which has the smallest summation value of pulse numbers, among the regions containing the pulse having the maximum pulse amplitude value. A timing signal indicative of an optimum signal estimation region is outputted to the coefficient setting unit 4 such that the optimum tap coefficients are supplied to the matching filter 2. Also, the position estimating unit 7 outputs the timing signal to the state estimator 3. The state estimator 3 carries out the optimum maximum likelihood sequence estimation.

On the other hand, the delayed decision feedback sequence estimator is described in "NEC Research and Development" by Hitoshi Matsui, (January, 1997, pp. 74 to 79). The method for determining the signal estimation region used in the conventional maximum likelihood sequence estimator is similarly applied to the method for determining the signal estimation region in this delayed decision feedback sequence estimator.

However, the above-described conventional examples have the following two problems.

The first problem is in that, depending upon the impulse response waveform, the optimum signal estimation region estimated in the delayed decision feedback sequence estimator is not coincident with the optimum estimation region estimated in the maximum likelihood sequence estimator. In other words, when the conventional maximum likelihood sequence estimation method for determining the optimum signal estimation region is applied to the delayed decision feedback sequence estimation method, the optimum signal estimation region cannot be always determined. This problem will now be explained more in detail.

As indicated in FIG. 2, in the delayed decision feedback sequence estimator, it could be considered that a region of the impulse response used for performing the optimum signal estimation is divided into the region for the maximum likelihood sequence estimation and the region for decision feedback equalization. Since the pulses of the impulse response in the decision feedback equalization region are canceled through the decision feedback equalizing calculation, even when the large power pulses are present in this region, these pulses do not contribute to the optimum signal estimation. As a consequence, in accordance with the calculating method in which the maximum likelihood sequence estimation region and the decision feedback equalization region are combined with each other, the optimum signal estimation region is not always found out.

FIG. 3 schematically illustrates such an impulse response when a large power pulses are present in the decision feedback equalization region. Referring to FIG. 3, when the large power pulses are present in the decision feedback equalization region, the calculation error in the decision feedback equalization is increased as much as it is not negligible, because of a quantization error generated in the calculating circuit of the delayed decision feedback sequence estimator.

The second problem is in that the calculation by use of a complex algorithm is required until the optimum signal estimation region is determined.

FIG. 4 is an explanatory diagram for explaining such a state. As indicated in FIG. 4, the pulse amplitude values of the impulse response for the transmission channel are allocated with pulse numbers from the smallest number in order of larger pulse amplitude value until the optimum signal estimation region is determined. Thus, the amplitude values of pulses of the impulse response must be compared with each other. Further, the comparison process operation must be repeatedly carried out plural times in order to determine the optimum signal estimation region. As a result, the overall algorithm becomes complex. In particular, when the number of taps of the matching filter is increased, the calculation amount thereof is increased.

SUMMARY OF THE INVENTION

The present invention has been made to solve the above-described problems. Therefore, an object of the present invention is to provide a method and apparatus for delayed decision feedback sequence estimation, in which an optimum signal estimation region can be reliably and accurately determined from an impulse response for a transmission path by use of a simple algorithm without using a large-scaled calculation method such as multiplication.

Another object of the present invention is to provide a delayed decision feedback sequence estimating and receiving apparatus which can be operated under low power consumption with a simple circuit structure so that it can be made compact in light weight.

In order to achieve an aspect of the present invention, a delayed decision feedback sequence estimating apparatus includes a transmission channel characteristic detecting unit for detecting a transmission channel characteristic for a training signal, a timing detecting unit for detecting when there is obtained a maximum of ratios of a summation value of absolute values of amplitude components of the transmission channel characteristic for a maximum likelihood sequence estimation region to an addition of a value obtained by multiplying, by a predetermined value, a summation value of absolute values of amplitude components of the transmission channel characteristic for a decision feedback equalization region and a power summation value of absolute values of amplitude components of the transmission channel characteristic for a region other than the maximum likelihood sequence estimation region and the decision feedback equalization region, as an out-of-estimation region, to generate a timing signal, and a delayed decision feedback sequence estimating unit for executing a maximum likelihood sequence estimation of an inputted reception signal with a transmission distortion based on the transmission channel characteristic detected by the transmission channel characteristic detecting unit and the timing signal outputted from the timing detecting unit to output a transmission signal.

The timing detecting unit may include an absolute value calculating unit for calculating the absolute values of the amplitude components of the transmission channel characteristic detected by the transmission channel characteristic detecting unit, a summing unit for calculating the summation values of the absolute values of the amplitude components calculated by the absolute value calculating unit, and a maximum value detecting unit for detecting when there is obtained a maximum of the ratios of the summation value of the absolute values of the amplitude components of the transmission channel characteristic for the maximum likelihood sequence estimation region to the addition of a value obtained by multiplying, by the predetermined value, the summation value of the absolute values of the amplitude components of the transmission channel characteristic for the decision feedback equalization region and the summation value of the absolute values of the amplitude components of the transmission channel characteristic for the out-of-estimation region, to generate a timing signal.

The absolute value calculating unit may includes a first absolute value calculating unit for calculating an absolute value of a real part of each of the amplitude components of the transmission channel characteristic, a second absolute value calculating unit for calculating an absolute value of an imaginary part of each of the amplitude components of the transmission channel characteristic, a comparing unit for comparing the absolute value of the real part supplied from the first absolute value calculating unit with the absolute value of the imaginary part supplied from the second absolute value calculating unit to output a comparison resultant signal, a switching unit responsive to the comparison signal, for respectively outputting the absolute value of the real part and the absolute value of the imaginary part as first and second absolute values, when the absolute value of the real part is equal to or larger than the absolute value of the imaginary part, and for respectively outputting the absolute value of the real part and the absolute value of the imaginary part as the second and first absolute values, when the absolute value of the real part is smaller than the absolute value of the imaginary part, a multiplying unit for multiplies the second absolute value by a predetermined value to produce a multiplied absolute value, and an adding unit for adding the first absolute value and the multiplied absolute value to output an added absolute value as the absolute value of the amplitude component.

The summing unit may include a first summing unit for calculating the summation values of the absolute values of the amplitude components of the transmission channel characteristic for the maximum likelihood sequence estimation region, and a second summing unit for calculating the summation values of the absolute values of the amplitude components of the transmission channel characteristic for the out-of-estimation region. Alternatively, the summing unit may include a plurality of delay elements connected in series, for delaying each of the absolute values supplied from the absolute value calculating unit for every symbol, a first adding unit for adding the absolute values supplied from the absolute value calculating unit and the delayed absolute values supplied from the delay elements corresponding to the maximum likelihood sequence estimation region to output the summation value for the maximum likelihood sequence estimation region, and a second adding unit for adding the delayed absolute values from ones of the delay elements corresponding to the out-of-estimation region to output the summation value for the out-of-estimation region.

The maximum value detecting unit may include a level ratio detecting unit for detecting a ratio of the summation value for the maximum likelihood sequence estimation region to the summation value for the out-of-estimation region, and a maximum value timing detecting unit for detecting when there is obtained the maximum value of the ratios of the summation value for the maximum likelihood sequence estimation region to the summation value for the out-of-estimation region to generate the timing signal. In this case, the level ratio detecting unit may include a level shifter for reducing a number of bits of each of the summation value for the maximum likelihood sequence estimation region and the summation value for the out-of-estimation region which are supplied from the summing unit, and a ROM for outputting the ratio of the maximum likelihood sequence estimation region summation value to the out-of-estimation region summation value in response to the reduced maximum likelihood sequence estimation region summation value and the reduced out-of-estimation region summation value. Also, the maximum value timing detecting unit may include a first register for storing the ratio outputted from the level ratio detecting unit, a comparing unit for comparing the ratio supplied from the level ratio detecting unit with the ratio supplied from the first register, a selecting unit for selecting the ratio supplied from the level ratio detecting unit as a maximum value, when the ratio supplied from the level ratio detecting unit is equal to or larger than the ratio supplied from the first register, for selecting the ratio supplied from the first register, when the ratio supplied from the level ratio detecting unit is smaller than the ratio supplied from the first register, and for storing the selected ratio in the first register, a counter for counting a number of ratios supplied from the level ratio detecting unit, and a second register for storing the count value from the counter in response to an output signal from the comparing unit to output the timing signal to the delayed decision feedback sequence estimating unit.

Alternatively, when the predetermined value is not 0, the summing unit may include a first summing unit for calculating the summation values of the absolute values of the amplitude components of the transmission channel characteristic for the maximum likelihood sequence estimation region, a second summing unit for calculating the summation values of the absolute values of the amplitude components of the transmission channel characteristic for the decision feedback equalization region, and a third summing unit for calculating the summation value of the absolute values of the amplitude components of the transmission channel characteristic for the out-of-estimation region. Instead, the summing unit may include a plurality of delay elements connected in series, for each delaying each of the absolute values supplied from the absolute value calculating unit for every symbol, a first adding unit for adding the absolute values supplied from the absolute value calculating unit and the delayed absolute values supplied from the delay elements corresponding to the maximum likelihood sequence estimation region to output the summation value for the maximum likelihood sequence estimation region, a second adding unit for adding the delayed absolute values from ones of the delay elements corresponding to the decision feedback sequence estimation region to output the summation value for the decision feedback equalization region, and a third adding unit for adding the delayed absolute values from ones of the delay elements corresponding to the out-of-estimation region to output the summation value for the out-of-estimation region.

The maximum value detecting unit may include a multiplying unit for multiplying the summation value for the decision feedback equalization region by the predetermined value to output the multiplied summation value, an adding unit for adding the multiplied summation value supplied from the multiplying unit to the summation value for the out-of-estimation region to output an added summation value, a level ratio calculating unit for calculating the ratio of the summation value for the maximum likelihood sequence estimation region to the added summation value from the adding unit, a maximum value timing detecting unit for detecting when there is obtained the maximum value of the ratios from an output of the level ratio calculating unit to generate the timing signal. Alternatively, the maximum value timing detecting unit may include a 3-bit shifter for reducing the ratio of the summation value for the maximum likelihood sequence estimation region to the added summation value outputted from the adding unit, a 6-bit shifter for reducing the ratio of the summation value for the maximum likelihood sequence estimation region to the added summation value outputted from the adding unit, and an adding unit for adding an output supplied from the 3-bit shifter to an output supplied from the 6-bit shifter to generate the timing signal. Instead, the maximum value timing detecting unit include a first register for storing the ratio outputted from the level ratio detecting unit, a comparing unit for comparing the ratio supplied from the level ratio detecting unit with the ratio supplied from the first register, a selecting unit for selecting the ratio supplied from the level ratio detecting unit as a maximum value, when the ratio supplied from the level ratio detecting unit is equal to or larger than the ratio supplied from the first register, for selecting the ratio supplied from the first register, when the ratio supplied from the level ratio detecting unit is smaller than the ratio supplied from the first register, and for storing the selected ratio in the first register, a counter for counting a number of ratios supplied from the level ratio detecting unit, and a second register for storing the count value from the counter in response to an output signal from the comparing unit to output the timing signal to the delayed decision feedback sequence estimating unit.

Here, the transmission distortion is frequency selective fading distortion in a multiple radio transmission system. Also, the transmission channel characteristic is an impulse response. The delayed decision feedback sequence estimating apparatus can be applied to a digital mobile terminal system.

In order to achieve another aspect of the present invention, a method of estimating a transmission signal from a reception signal in a delayed decision feedback sequence estimating apparatus comprising the steps of:

detecting a transmission channel characteristic for a training signal;

detecting when there is obtained a maximum of ratios of a summation value of absolute values of amplitude components of the transmission channel characteristic for a maximum likelihood sequence estimation region to an addition of a value obtained by multiplying, by a predetermined value, a summation value of absolute values of amplitude components of the transmission channel characteristic for a decision feedback equalization region and a power summation value of absolute values of amplitude components of the transmission channel characteristic for a region other than the maximum likelihood sequence estimation region and the decision feedback equalization region, as an out-of-estimation region, to generate a timing signal; and executing a maximum likelihood sequence estimation of an inputted reception signal based on the transmission channel characteristic detected by the transmission channel characteristic detecting unit and the timing signal outputted from the timing detecting unit to output a maximum likelihood sequence estimation data.

The step of detecting when there is obtained a maximum of ratios may include:

calculating the absolute values of the amplitude components of the transmission channel characteristic detected by the transmission channel characteristic detecting unit;

calculating the summation values of the absolute values of the amplitude components calculated by the absolute value calculating unit; and detecting when it is obtained a maximum of the ratios of the summation value of the absolute values of the amplitude components of the transmission channel characteristic for the maximum likelihood sequence estimation region to the addition of a value obtained by multiplying, by the predetermined value, the summation value of the absolute values of the amplitude components of the transmission channel characteristic for the decision feedback equalization region and the summation value of the absolute values of the amplitude components of the transmission channel characteristic for the out-of-estimation region, to generate a timing signal.

BRIEF DESCRIPTION OF THE DRAWINGS

FIG. 16 is a block diagram illustrating the detailed structure of the maximum value timing detecting unit in the maximum value detecting unit of the delayed decision feedback sequence estimating and receiving apparatus according to the second embodiment of the present invention.

DESCRIPTION OF THE PREFERRED EMBODIMENTS

Next, the delayed decision feedback sequence estimating and receiving apparatus of the present invention will be described below in detail with reference to the attached drawings.

Figure 5:
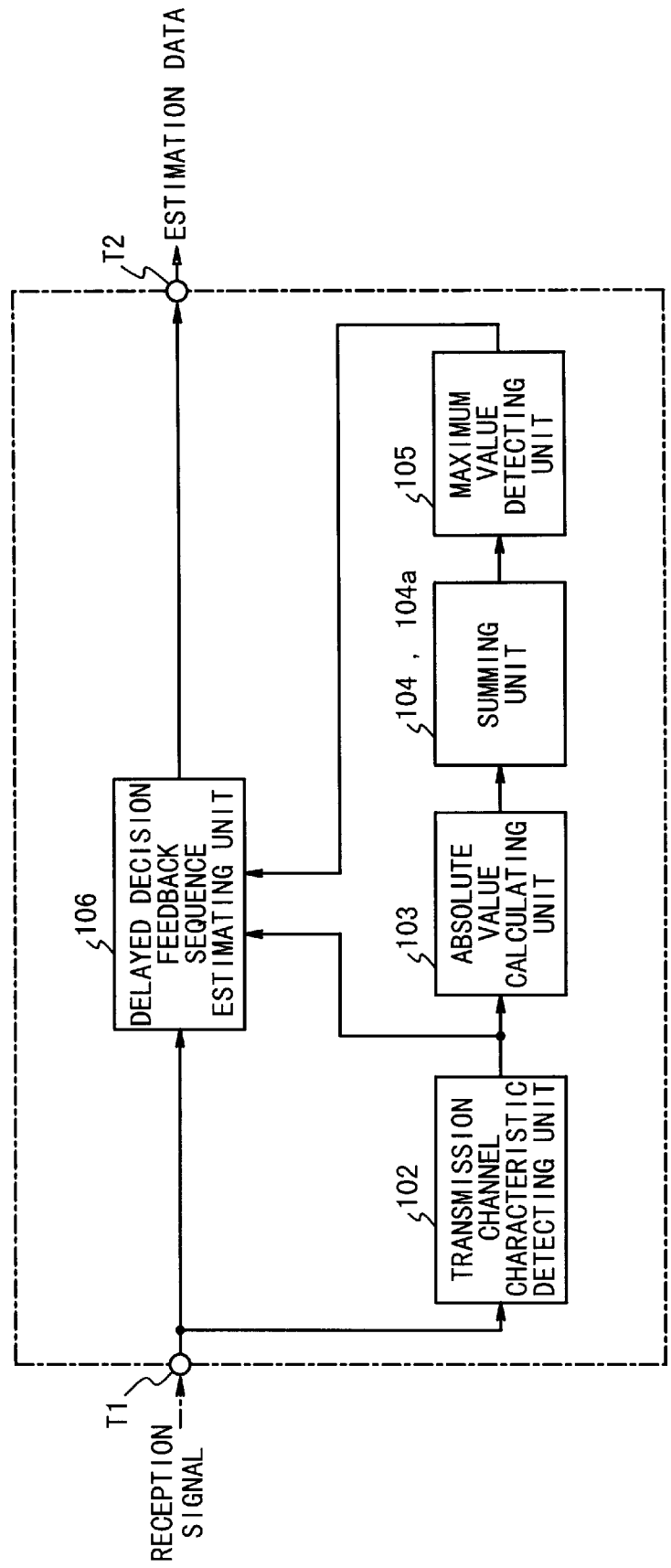
FIG. 5 is a block diagram illustrating the structure of a delayed decision feedback sequence estimating and receiving apparatus according to the first embodiment of the present invention.

FIG. 5 is a schematic block diagram for illustrating the structure of the delayed decision feedback sequence estimating and receiving apparatus according to the first embodiment of the present invention. Referring to FIG. 5, the delayed decision feedback sequence estimating and receiving apparatus is composed of a transmission channel characteristic detecting unit 102 and an absolute value calculating unit 103.

The transmission channel characteristic detecting unit 102 detects transmission channel characteristic such as an impulse response from an inputted training signal when the training signal is received through an input terminal T1.

The absolute value calculating unit 103 calculates amplitude components from the transmission channel characteristic, i.e., pulse amplitude of the impulse response detected by the transmission channel characteristic detecting unit 102.

The delayed decision feedback sequence estimating and receiving apparatus is further composed of a summing unit 104, a maximum value detecting unit 105, and a delayed decision feedback sequence estimating unit 106.

The summing unit 104 performs summation value of the absolute values of the amplitude components calculated by the absolute value calculating unit 103.

The maximum value detecting unit 105 detects when a maximum value of ratios of the summation value of the absolute values for a maximum likelihood sequence estimation region to an addition of a value obtained by multiplying, by a predetermined value α (which may be 0), a summation value of the absolute values for a decision feedback equalization region and a summation value of the absolute values for a region other than the maximum likelihood sequence estimation region and the decision feedback equalization region, as an out-of-estimation region is outputted from the summing unit 104 to generate a timing signal.

The delayed decision feedback sequence estimating unit 106 executes an estimation of the inputted reception signal based on the transmission channel characteristic detected by the transmission channel characteristic detecting unit 102 and the timing signal outputted from the maximum value detecting unit 105. As a result, an estimation data such as a transmission signal is outputted via an output terminal T2.

Figure 6:
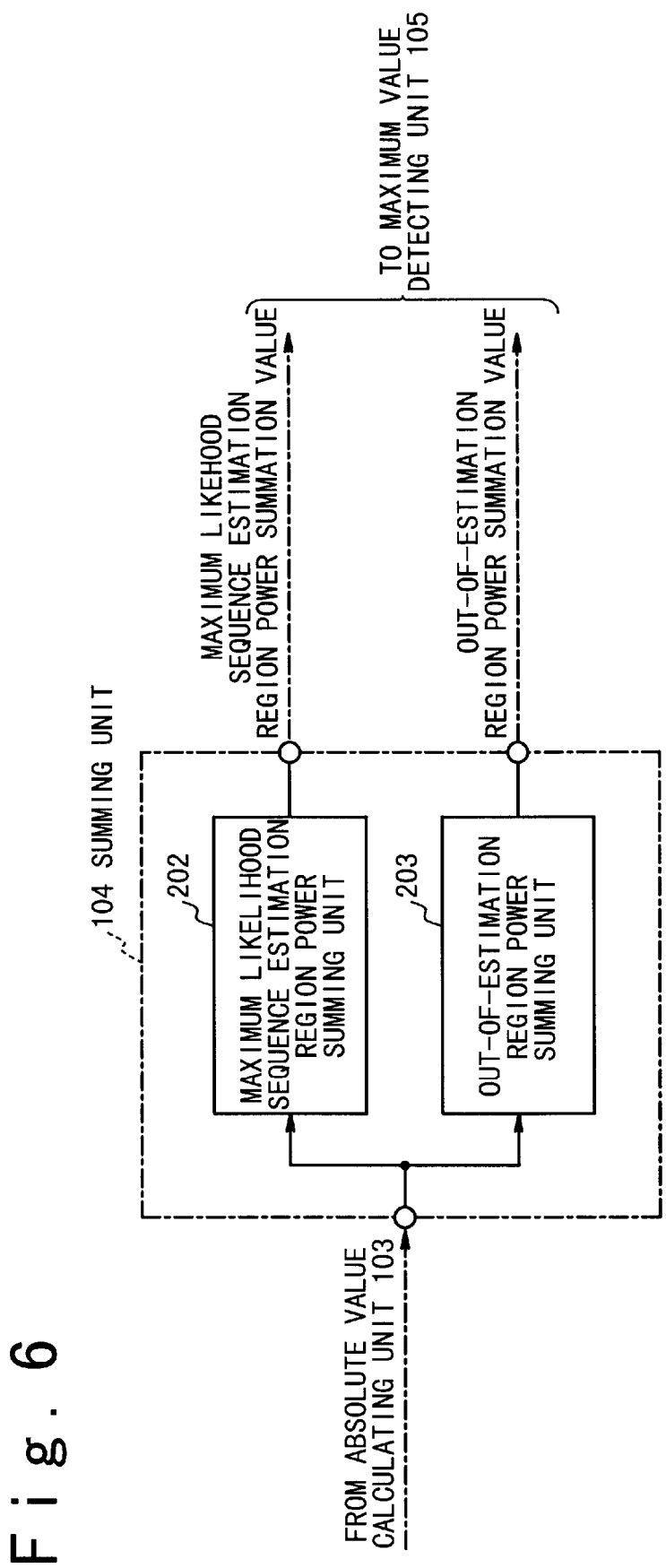
FIG. 6 is a block diagram illustrating the structure of a summing unit of the delayed decision feedback sequence estimating and receiving apparatus according to the first embodiment of the present invention.

FIG. 6 is a schematic block diagram for illustrating the detailed structure of the summing unit 104. In FIG. 6, the summing unit 104 is composed of a maximum likelihood sequence estimation region power summing unit 202, and an out-of-estimation region power summing unit 203.

The maximum likelihood sequence estimation region power summing unit 202 calculates a summation value of the absolute values of pulses of an impulse response for a maximum likelihood sequence estimation region. The out-of-estimation region power summing unit 203 calculates a summation value of the absolute values of pulses of the impulse responses for a region other than the maximum likelihood sequence estimation region and a decision feedback equalization region.

Figure 7:
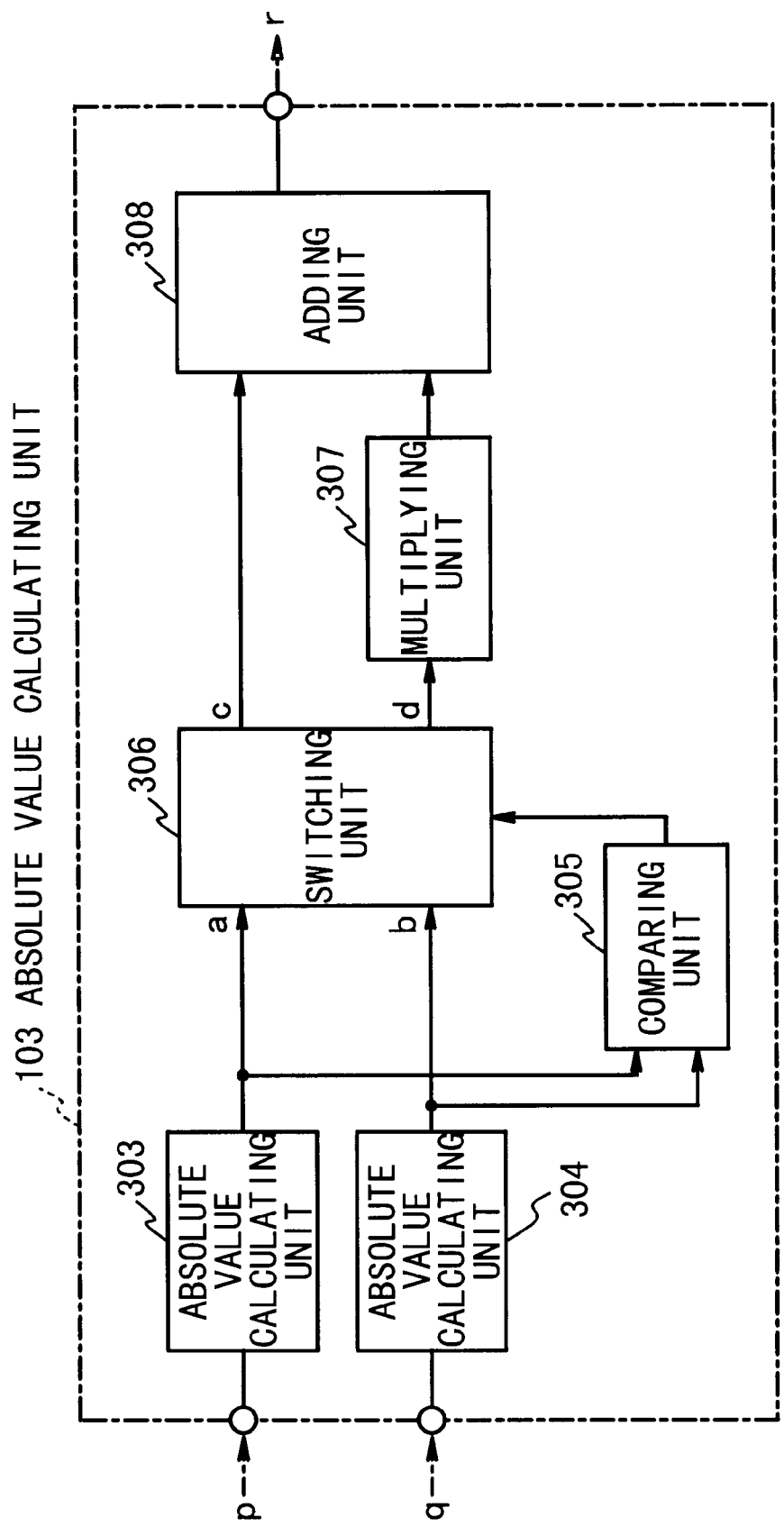
FIG. 7 is a block diagram illustrating the structure of an absolute value calculating unit of the delayed decision feedback sequence estimating and receiving apparatus according to the first embodiment of the present invention.

FIG. 7 is a schematic block diagram for illustrating the detailed structure of the absolute value calculating unit 103. Referring to FIG. 7, the absolute value calculating unit 103 is composed of two absolute value calculators 303 and 304, and a comparing unit 305.

The two absolute value calculating units 303 and 304 calculate absolute values of real parts and imaginary parts of complex signals of the transmission channel characteristic, respectively. The comparing unit 305 compares the absolute value of the real part of the complex signal supplied from the absolute value calculating unit 303 with the absolute value of the imaginary part of another complex signal supplied from the absolute value calculating 304 to output a comparison signal.

Furthermore, the absolute value calculating unit 103 is composed of a switching unit 306, a multiplying unit 307, and an adding unit 308. The switching unit 306 outputs the absolute value of the real part and the absolute value of the imaginary part as they are, when the absolute value of the real part is equal to or larger than the absolute value of the imaginary part as the comparing result by the comparing unit 305. Also, the switching unit 306 outputs the absolute value of the real part and the absolute value of the imaginary part such that the absolute value of the real part and the absolute value of the imaginary part are exchanged and outputted, when the absolute value of the real part is smaller than the absolute value of the imaginary part.

The multiplying unit 307 multiplies, by ½, the absolute value of the imaginary part when the absolute value of the real part outputted from the switching unit 306 is equal to or larger than the absolute value of the imaginary part. Also, the multiplying unit 307 multiplies, by ½, the absolute value of the real part which is exchanged by the switching unit 306 when the absolute value of the real part is smaller than the absolute part of the imaginary part. The adding unit 308 adds the output signal of the switching unit 306 to the output signal of the multiplying unit 307 to output an added absolute value signal.

Figure 8:
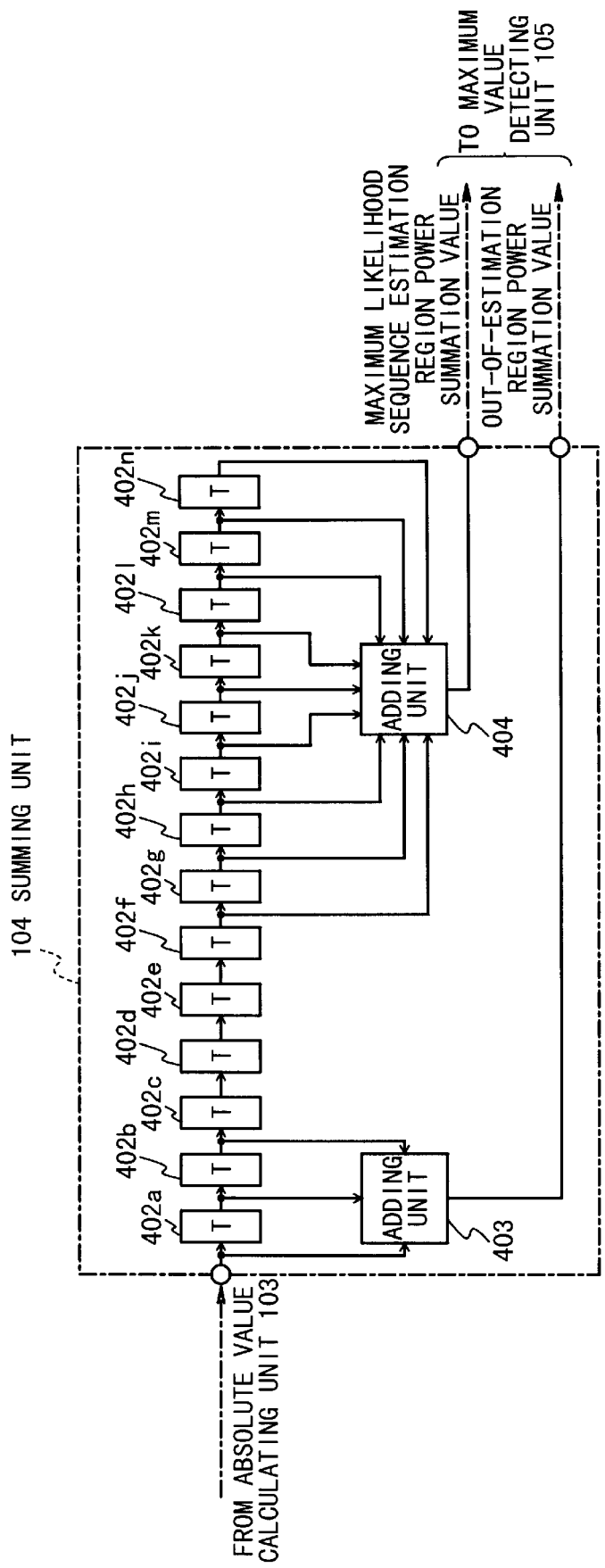
FIG. 8 is a block diagram illustrating the detailed structure of the summing unit of the delayed decision feedback sequence estimating and receiving apparatus according to the first embodiment of the present invention.

FIG. 8 is a schematic block diagram for illustrating the detailed structure of the summing unit 104. Referring to FIG. 8, the summing unit 104 is composed of delay elements 402a, 402b, 402c, 402d, 402e, 402f, 402g, 402h, 402i, 402j, 402k, 402l, 402m, and 402n connected in series. Each of these delay elements delays the absolute value signal supplied from the absolute value calculating unit 103 for every one symbol.

In addition, the summing unit 104 is also composed of an adding unit 403 and another adding unit 404. The adding unit 403 adds the absolute value signal supplied from the absolute value calculating unit 103 to the delayed signals supplied from the delay elements 402a and 402b to output a maximum likelihood sequence estimation region power summation value. The output signals of the three delay elements 402c, 402d and 402e are not added. The adding unit 404 adds the delayed signals from the delay elements 402f to 402n for the nine remaining symbols to each other to output an out-of-estimation region power summation value.

Figure 9:
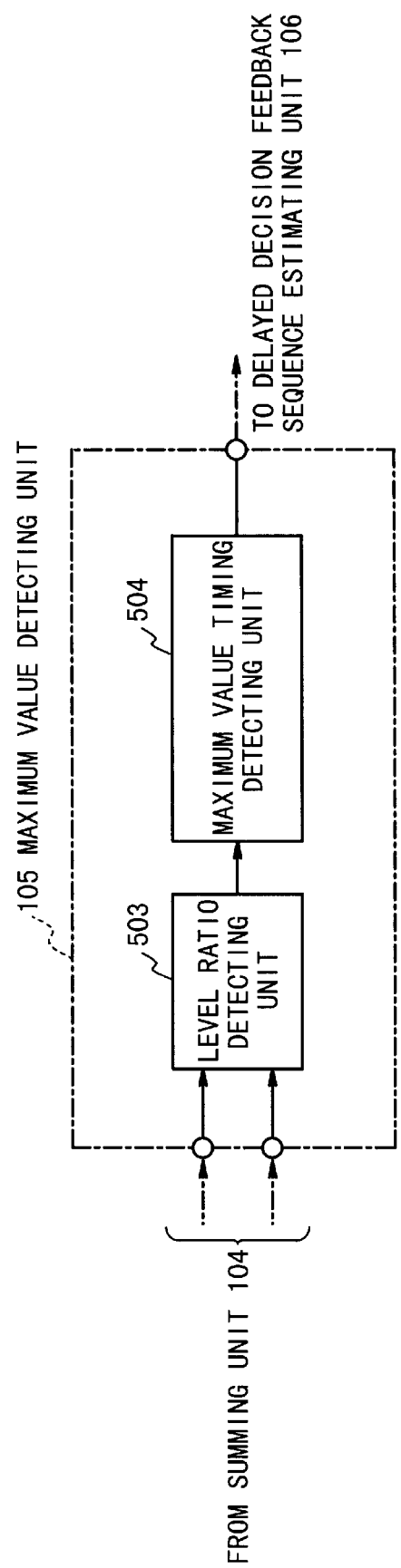
FIG. 9 is a block diagram illustrating the detailed structure of the maximum value detecting unit of the delayed decision feedback sequence estimating and receiving apparatus according to the first embodiment of the present invention.

FIG. 9 is a schematic block diagram for illustrating the detailed structure of the maximum value detecting unit 105. Referring to FIG. 9, the maximum value detecting unit 105 is composed of a level ratio detecting unit 503, and a maximum value timing detecting unit 504.

The level ratio detecting unit 503 detects a ratio of the maximum likelihood sequence estimation region power summation value to the out-of-estimation region power summation value. The maximum value timing detecting unit 504 detects when a maximum value of the ratios of the maximum likelihood sequence estimation region power summation value to the out-of-estimation region power summation value is obtained to generate a timing signal.

Figure 10:
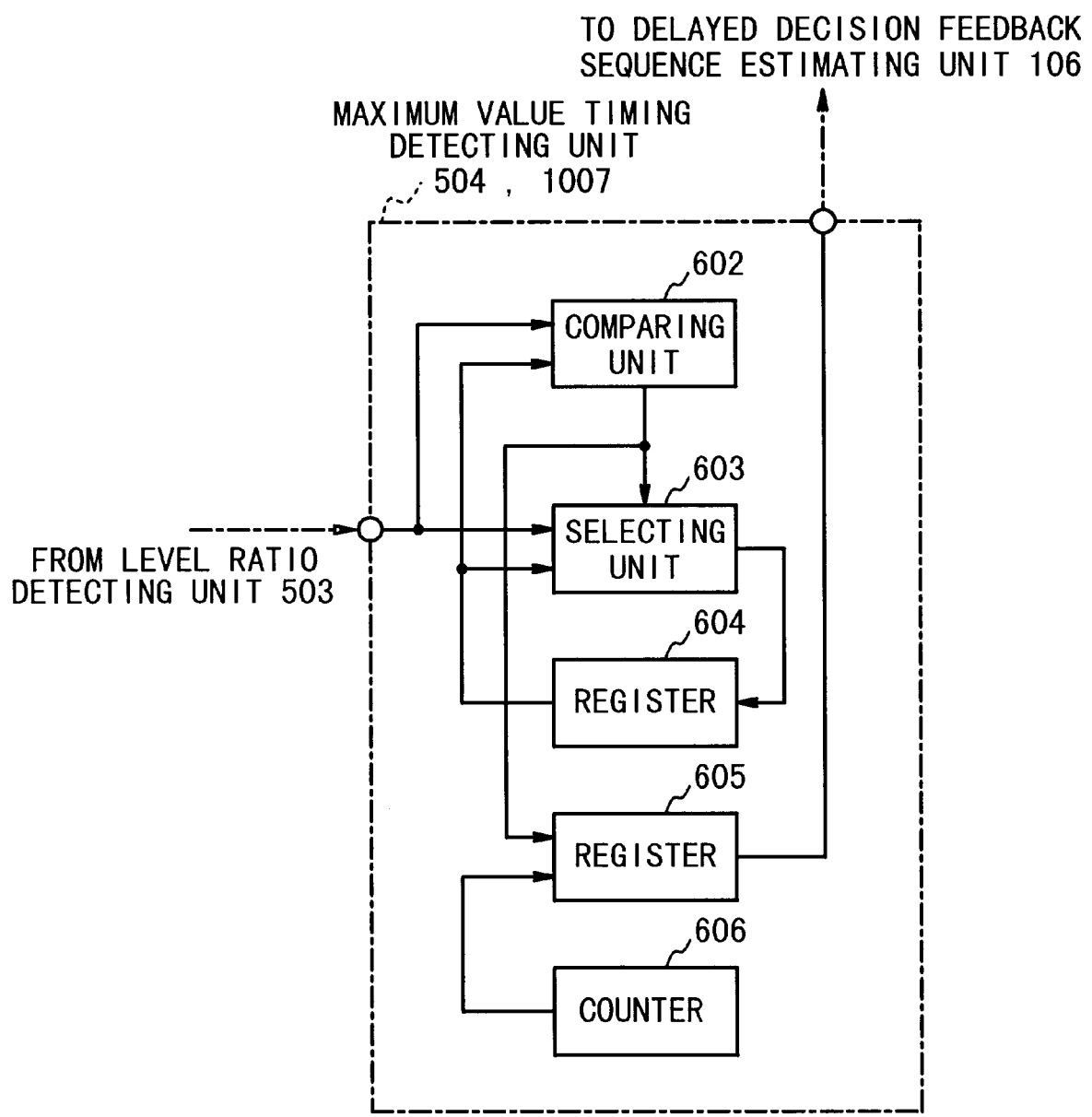
FIG. 10 is a block diagram illustrating the detailed structure of a maximum value timing detecting unit in the maximum value detecting unit of the delayed decision feedback sequence estimating and receiving apparatus according to the first embodiment of the present invention.

FIG. 10 is a schematic block diagram for illustrating the detailed structure of the maximum value timing detecting unit 504 shown in FIG. 9. Referring to FIG. 10, this maximum value timing detecting unit 504 is composed of a register 604 for storing a maximum value among the level ratio values outputted from the level ratio detecting unit 503, and a comparing unit 602 for comparing the signal supplied from the summing unit 104 with the signal supplied from the register 604.

In addition, the maximum value timing detecting unit 504 is further composed of a selecting unit 603, a counter 606, and a register 605. The selecting unit 603 inputs both of the signal supplied from the summing unit 104 and the signal supplied from the register 604. When the signal supplied from the summing unit 104 is equal to or larger than the signal supplied from the comparing unit 602, the selecting unit 603 selects and output the signal supplied from the summing unit 104 as a maximum value. When the signal supplied from the summing unit 104 is smaller than the signal supplied from the register 604, the selecting unit 603 selects the signal supplied from the register 604. The selected signal is stored in the register 604. The counter 606 counts the number of summation values to outputs a count value. The register 605 stores the count value from the counter 606 in response to the output signal from the comparing unit 602, and outputs a timing value to be described later, to the delayed decision feedback sequence estimating unit 106.

Figure 11:
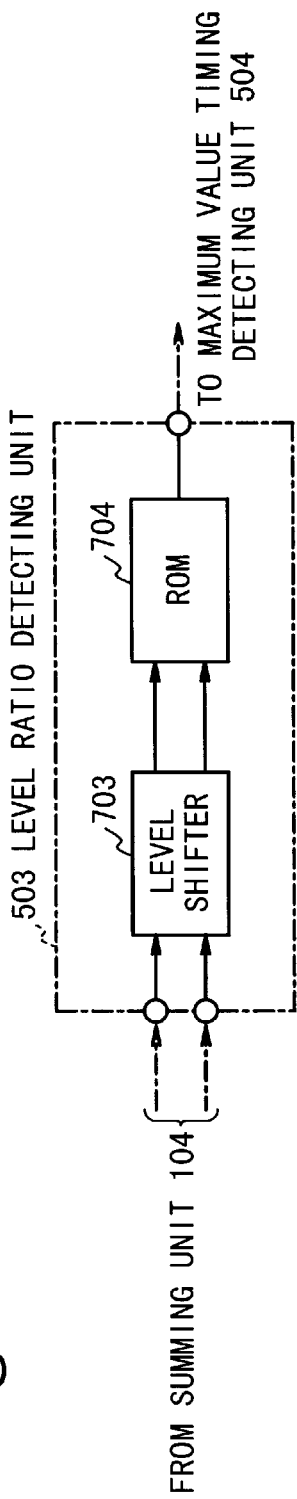
FIG. 11 is a block diagram illustrating the detailed structure of a level ratio calculating unit in the maximum value detecting unit of the delayed decision feedback sequence estimating and receiving apparatus according to the first embodiment of the present invention.

FIG. 11 is a schematic block diagram for illustrating the detailed structure of the level ratio detecting unit 503 shown in FIG. 9. Referring to FIG. 11, the level ratio detecting unit 503 is composed of a level shifter 703 and a ROM (read only memory) 704.

The level shifter 703 is used to reduce the number of bits of each of the maximum likelihood sequence estimation region power summation value supplied from the summing unit 104 and the out-of-estimation region power summation value supplied therefrom. The ROM 704 is used to determine a ratio of the maximum likelihood sequence estimation region power summation value to the out-of-estimation region power summation value which are both outputted from the level shifter 703.

Next, an overall operation of the above-described delayed decision feedback sequence estimating and receiving apparatus will now be explained with reference to FIGS. 5 and 6. In this example, as the signal estimation region for the delayed decision feedback sequence estimating unit 106, a case will be described where the maximum likelihood sequence estimation region contains three symbols, and the decision feedback equalization region contains three symbols. Also, as a training symbol, a 15-bit M sequence pseudo random number code (PN code) is used.

The transmission channel characteristic detecting unit 102 perform a correlation calculation of the received training signal symbol and the PN code to detect an impulse response for 15 symbols on the transmission channel. The absolute value calculating unit 103 calculates the absolute values of pulse amplitude values of the impulse response for the 15-symbol length. The maximum likelihood estimation region power summing unit 202 of the summing unit 104 shown in FIG. 6 calculates a summation value of the absolute values of the pulse amplitude values of the impulse response of the maximum likelihood sequence estimation region shown in FIG. 2.

The out-of-estimation region power summing unit 206 calculates a summation value of the absolute values of the pulse amplitude value of the impulse responses for the region other than the maximum likelihood sequence estimation region and the decision feedback equalization region. This calculation is repeatedly carried out 15 times while shifting the timing.

The maximum value detecting unit 105 acquires the maximum likelihood sequence estimation region power summation value and the out-of-estimation region power summation value for each of 15 symbols which is equal to one period length of the PN code. The maximum value detecting unit 105 outputs to the delayed decision feedback sequence estimating unit 106, a signal indicative of when the ratio of the maximum likelihood estimation region power summation value to the out-of-estimation region power summation value indicates the largest ratio. As a consequence, the delayed decision feedback sequence estimating unit 106 can determine that what region of the impulse response is to be used for the estimation of the inputted reception signal with the highest estimation precision, based on the impulse response of the transmission channel characteristic detecting unit 102 and the output signal of the maximum value detecting unit 105.

This overall operation will now be described more in detail.

Figure 1:
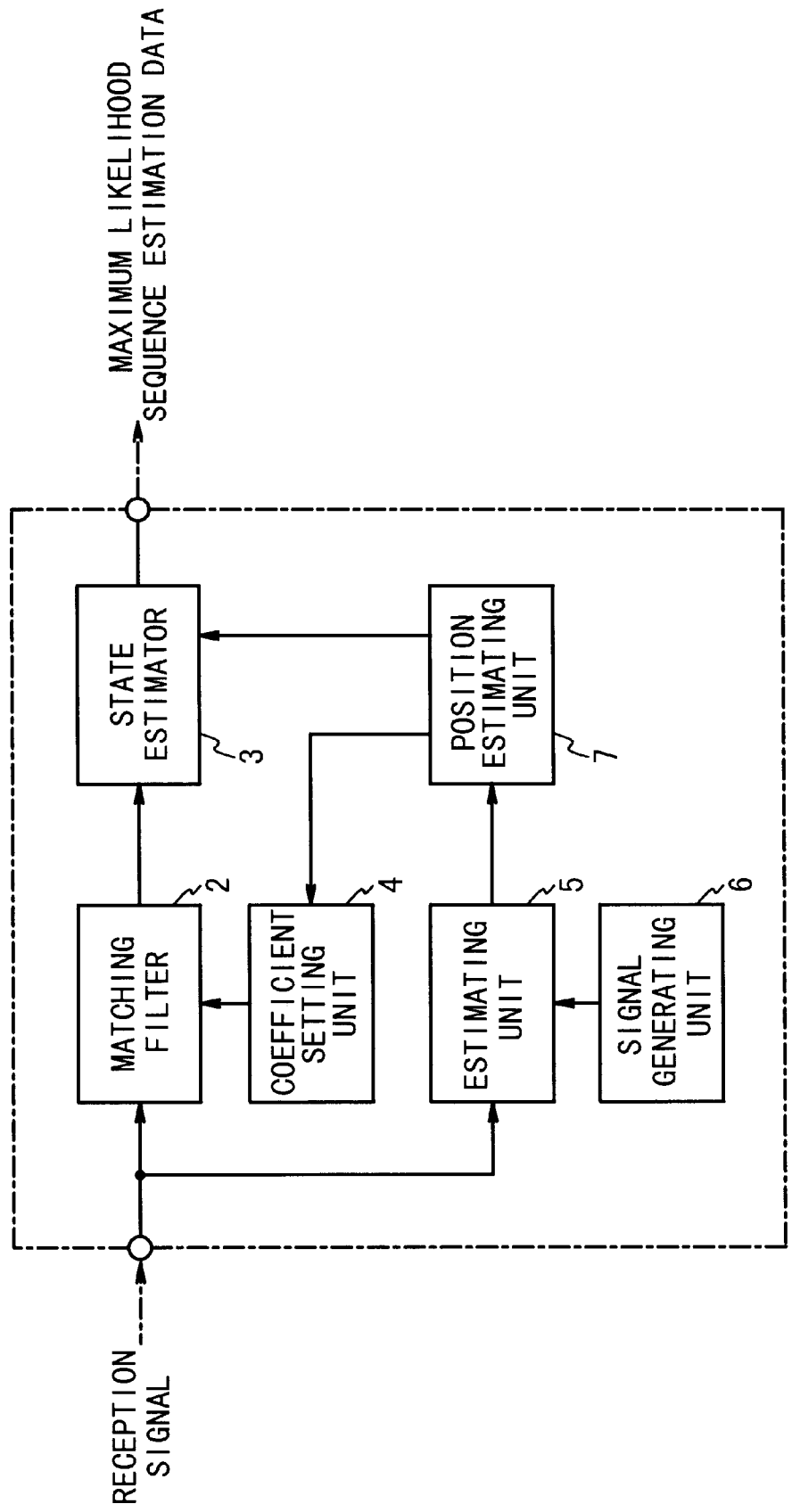
FIG. 1 is a block diagram illustrating the structure of a conventional maximum likelihood sequence estimator and the delayed decision feedback sequence estimator.
Figure 2:
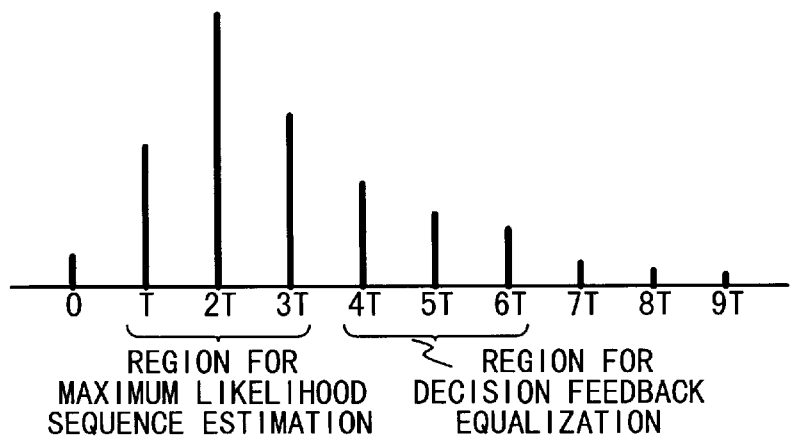
FIG. 2 is a diagram to explain an impulse response in the conventional maximum likelihood sequence estimator and the delayed decision feedback sequence estimator.
Figure 3:
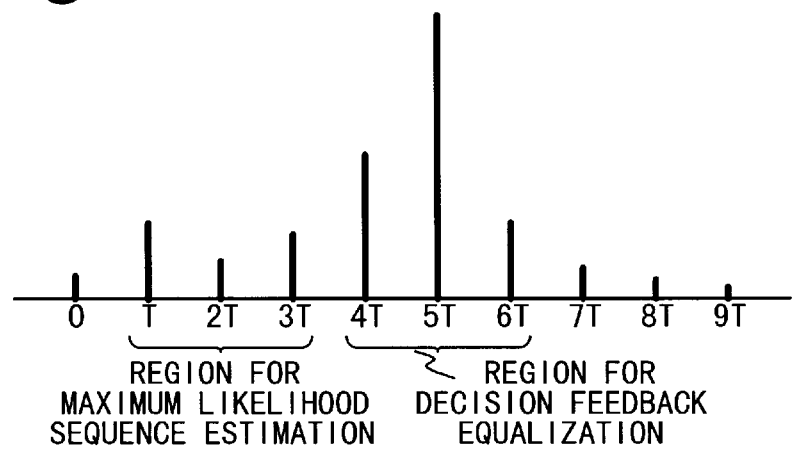
FIG. 3 is a diagram to explain an impulse response in which large power components are present in a decision feedback sequence region in the conventional maximum likelihood sequence estimator.
Figure 4:
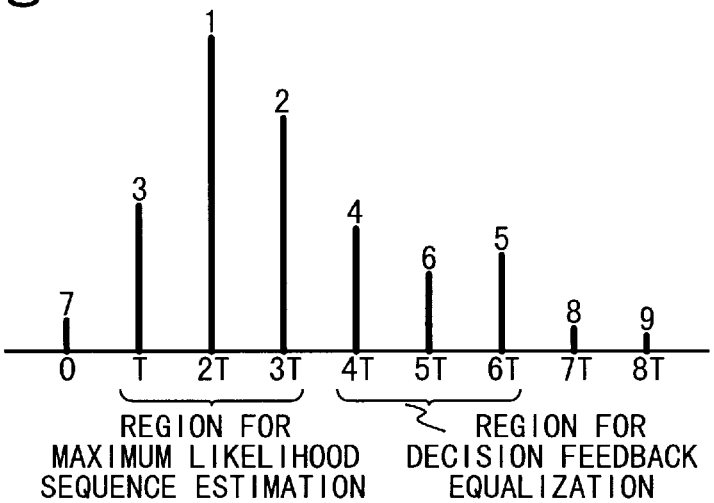
FIG. 4 is a diagram to explain the state in which pulses of the impulse response are allocated with pulse numbers from the smallest number in order of larger pulse.

Referring to FIG. 5, when the training signal is received, the correlation calculation is carried out between the inputted reception signal and the 15-bit M sequence PN code by the transmission channel characteristic detecting unit 102. In this correlation calculation, the above-explained impulse response shown in FIG. 2 is outputted as a time sequence signal for the 15 symbols. It should be noted that FIG. 2 shows the example of the one-dimensional symbols, whereas the actual transmission channel characteristic are expressed by complex numbers.

An approximate absolute value calculation is carried out to the time sequence signal of the impulse response by the absolute value calculating unit 103. When the time sequence signal is an one-dimensional signal, the absolute value signal thereof can be calculated by determining whether a polarity of the time sequence signal is positive or negative, and by performing a subtraction when the polarity of the time sequence signal is negative. However, when the time sequence signal is a complex signal, an absolute value thereof cannot be correctly calculated only by performing the adding or subtracting operation. As a consequence, the absolute values of the complex signal are approximated by use of the absolute value calculating unit 103 shown in FIG. 7.

It is now assumed that a real part of a complex signal is selected to be "p", and an imaginary part of this complex signal is selected to be "q" in this calculation. In the case, if an absolute value is selected to be "r", then the absolute value "r" can be calculated by the following equation (1), when the absolute value of the real part "p" is equal to or larger than the absolute value of the imaginary part "q".

$$r=abs(p)+abs(q)/2 \qquad (1)$$

where abs(p) and abs(q) are the absolute value of the real part "p" and the absolute value of the imaginary part "q".

Also, when the absolute value of the real part "p" is smaller than the absolute value of the imaginary part "q", the absolute value "r" can be calculated by the following equation (2).

$$r=abs(p)/2+abs(q) \qquad (2)$$

In FIG. 7, one absolute value of "abs(p)" is calculated by the absolute value calculating unit 303, and the other absolute value of "abs(q)" is calculated by the absolute value calculating unit 304. The comparing unit 305 compares the absolute value of abs(p) with the absolute value of abs(q). The comparison result is supplied to the switching unit 306. In the switching unit 306, the input terminal "a" is connected to the output terminal "c" and the input terminal "b" is connected to the output terminal "d", when the absolute value of abs(p) is equal to or larger than the absolute value of abs(q). On the other hand, in the switching unit 306, the input terminal "a" is connected to the output terminal "d", and the input terminal "b" is connected to the output terminal "c", when the absolute value of abs(p) is smaller than the absolute value of abs(q).

The signal supplied from the output terminal "d" of the switching unit 306 is supplied to the multiplying unit 307, so that the value of this signal is reduced to ½. The multiplying unit 307 may be realized by way of the bit shift calculation. The signal supplied from the output terminal "c" of the switching unit 306 is added to the output signal supplied from the multiplying unit 307. Thus, the added signal is outputted as an absolute value signal. In the summing unit 104, the absolute value signal supplied from the absolute value calculating unit 103 is continuously summed for 15 symbols and is outputted as a summation value signal.

In the summing unit 104 of FIG. 8, the absolute value signal supplied from the absolute value calculating unit 103 is supplied to the delay element 402a. Then, the absolute value signal is delayed every one symbol timing, and the delayed signal is shifted from the delay element 402b to the delay element 402n. The absolute value signal supplied from the absolute value calculating unit 103, and the delayed signals supplied from the delay elements 402a and 402b are supplied to the adding unit 403 to be added to each other. The added signal is outputted as a maximum likelihood sequence estimation region power summation value. The signals for the next 3 symbols are not outputted. The signals for the remaining 9 symbols are added to each other by the adding unit 404. Thus, the added signal is outputted as an out-of-estimation region power summation value. As the output signal of the summing unit 104, the summation values for 15 times are outputted to the maximum value detecting unit 105.

In FIGS. 9 and 10, the maximum value detecting unit 105 detects that the ratio of the maximum likelihood sequence estimation region power summation value to the out-of-estimation region power summation value becomes maximum at what timing among the ratios for 15 symbols. As an initial value, 0 is inputted into the register 604, and also 0 is set to the counter 606 shown in FIG. 10. Both of the maximum likelihood sequence estimation region power summation value and the out-of-estimation region power summation value are supplied to the level ratio detecting unit 503 in order, such that the ratio of the maximum likelihood sequence estimation region power summation value to the out-of-estimation region power summation value is calculated. The calculated ratio is outputted to the maximum value timing detecting unit 504.

In the maximum timing detecting unit 504 shown in FIG. 10, the value stored in the register 604 is compared with the summation value supplied from the summing unit 104 by the comparing unit 602. When the summation value is equal to or larger than the stored value, the summation value is selected by the selecting unit 603, and then the selected value is supplied as a maximum summation value to the register 604. At this time, the count value of the counter 606 is written into the register 605. On the other hand, when the summation value supplied from the summing unit 104 is smaller than the stored value supplied from the register 604, the stored value from the register 604 is saved in the register as it is. This is because the selecting unit 603 selects the stored value supplied from the register 604. Also, the count value of the counter 606 is not written into the register 605, but the register 605 holds the stored value.

Since this calculation is repeatedly performed 15 times, the maximum value among the ratios of the maximum likelihood sequence estimation region power summation value to the out-of-estimation region power summation value, which ratios are outputted from the summing unit 104, is stored into the register 604. Also, the timing value corresponding to the maximum value is stored into the register 605. The value of the register 605 is outputted to the delayed decision feedback sequence estimating unit 106.

The level ratio detecting unit 503 shown in FIG. 11 requires the multiplication to calculate the ratio of the maximum likelihood sequence estimation region power summation value to the out-of-estimation region power summation value. In this case, the divider has a problem in that the calculation scale thereof is increased. To calculate the level ratio without using this divider, the level ratio detecting unit 503 with a ROM shown in FIG. 11 is used. In this case, if the number of bits of the summation value signal supplied from the summing unit 104 is increased, the number of addresses of the ROM is also increased. As a result, the merit achieved by use of the divider with the ROM would be lost.

To avoid this problem, the number of bits is reduced by the level shifter 703. For instance, it is now assumed that the number of bits for the address of the ROM 704 is selected to be 8 bits (=4 bits+4 bits). Also, it is assumed that the values of the summation value signals supplied from the summing unit 104 are "88, and 104", respectively. In this case, each of these summation value signals is bit-shifted by 3 bits. In other words, these values of the summation value signals are reduced to ⅛ of the values to become "11 and 13", respectively. These values are used as the address (4 bits+4 bits) of the ROM 704. When the values to be inputted are "18 and 2", these values are shifted by 1 to become "9 and 1", respectively.

In the delayed decision feedback sequence estimating unit 106, the impulse response as shown in FIG. 2 is supplied for 15 symbols from the transmission channel characteristic detecting unit 102. Also, a symbol indicative of a time "T" is supplied as a timing symbol from the maximum value detecting unit 105. As a result, in FIG. 2, pulse values of impulse response appearing at times T, 2T, and 3T are used for the signal estimation. Also, pulse values of impulse response appearing at times 4T, 5T, and 6T are used for the decision feedback sequence equalization.

Figure 12:
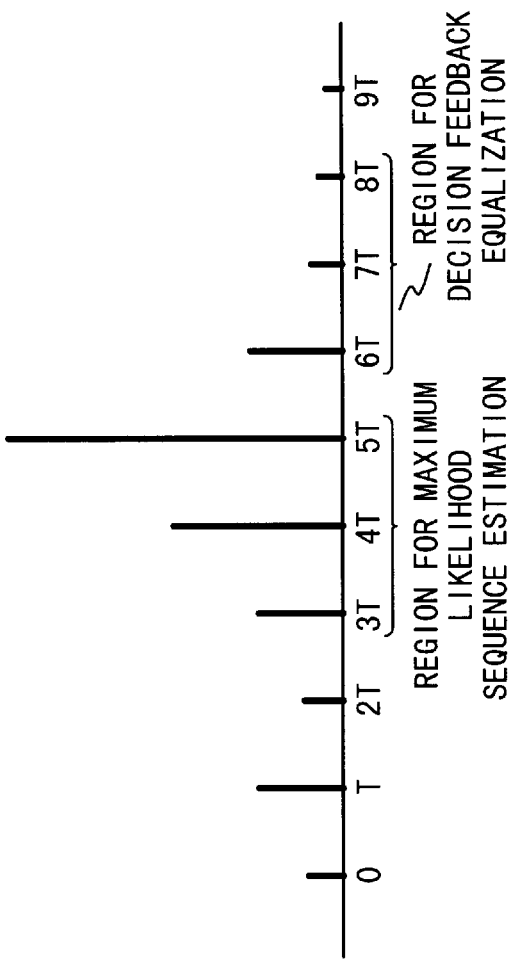
FIG. 12 is a diagram to explain the optimum timing in the delayed decision feedback sequence estimating and receiving apparatus according to the first embodiment of the present invention.

FIG. 12 is an explanatory diagram for explaining optimum timing obtained in this process operation. In FIG. 12, it is assumed that the transmission channel characteristic is represented as an impulse response as shown in FIG. 12. In this case, in the conventional sequence estimating system, the region defined from the time T to the time 3T is used as the maximum likelihood sequence estimation region, whereas the region defined from the time 4T to the time 6T is as the decision feedback equalization region.

However, in the first embodiment of the present invention, as shown in FIG. 12, the timing shifted for two pulses is determined as optimum timing.

In accordance with the conventional sequence estimation method, it is assumed that the power component of the maximum likelihood sequence estimation region is "P", the power component of the decision feedback equalization region is "Q", and the power component of the other remaining region is "R". In this case, a maximum point of (P+Q)/R is selected as the optimum timing. To the contrary, in accordance with the first embodiment, another maximum point of P/R is selected as the optimum timing. This is because the power component Q is canceled in the decision feedback equalizing calculation of the delayed decision feedback sequence estimating unit 106, so that neither the improvement of the estimation characteristic occurs, nor the deterioration of the estimation characteristic occurs.

Next, the delayed decision feedback sequence estimating and receiving apparatus according to the second embodiment of the present invention will be described.

Figure 13:
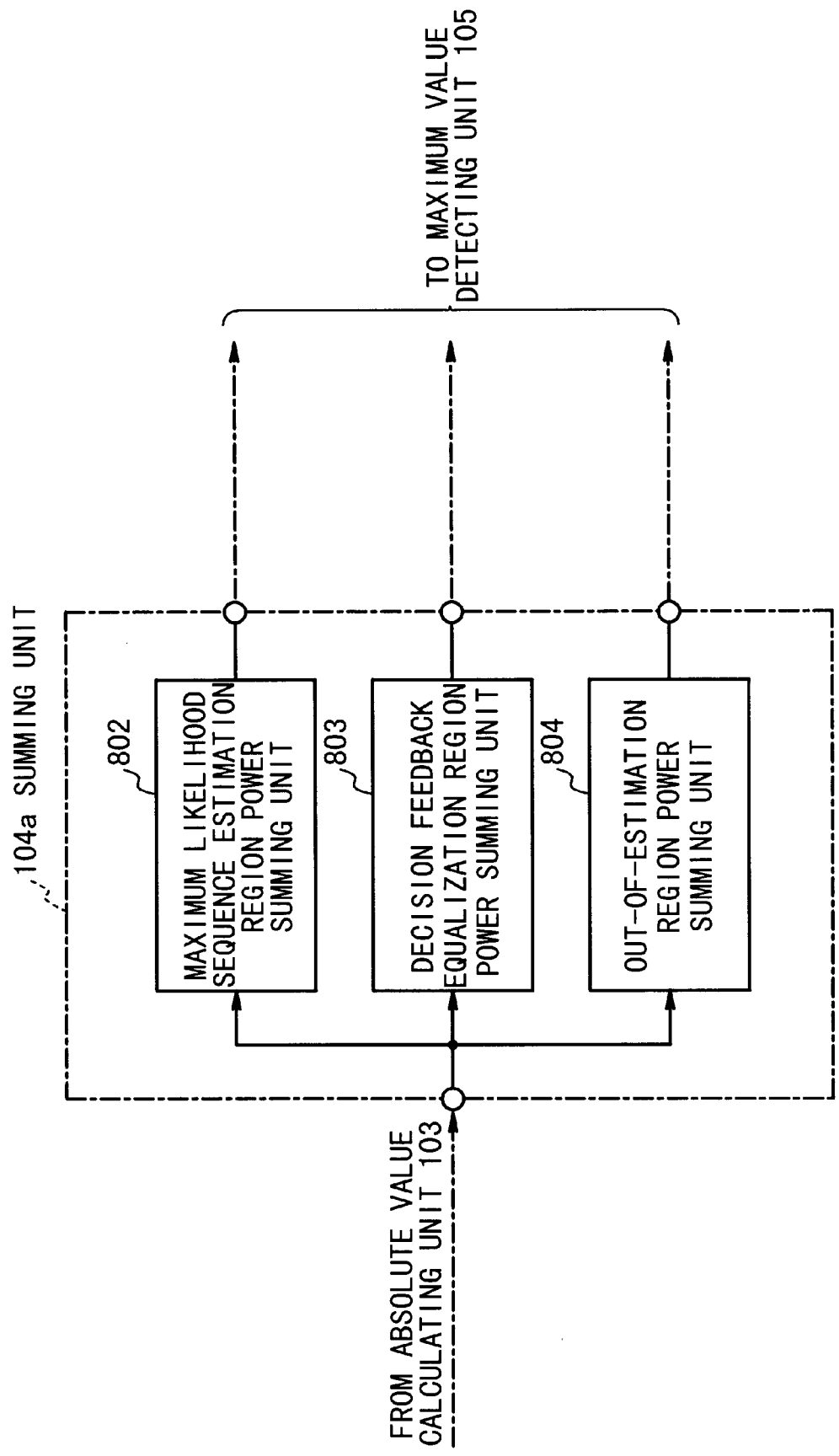
FIG. 13 is a block diagram illustrating the structure of a summing unit of the delayed decision feedback sequence estimating and receiving apparatus according to the second embodiment of the present invention.

FIG. 13 is a schematic block diagram for illustrating the structure of a summing unit 104a used in the second embodiment. Referring to FIG. 13, the summing unit 104 is composed of a maximum likelihood estimation region power summing unit 802, a decision feedback equalization region power summing unit 803, and an out-of-estimation region power summing unit 804.

The maximum likelihood estimation region power summing unit 802 calculates a summation value of absolute values of impulse response for a maximum likelihood sequence estimation region. The decision feedback equalization region power summing unit 803 calculates a summation value of absolute values of the impulse response for a decision feedback equalization region. The out-of-estimation region power summing unit 203 calculates a summation value of absolute values of the impulse response for a region other than the maximum likelihood sequence estimation region and the decision feedback equalization region, i.e., an out-of-estimation region.

Figure 14:
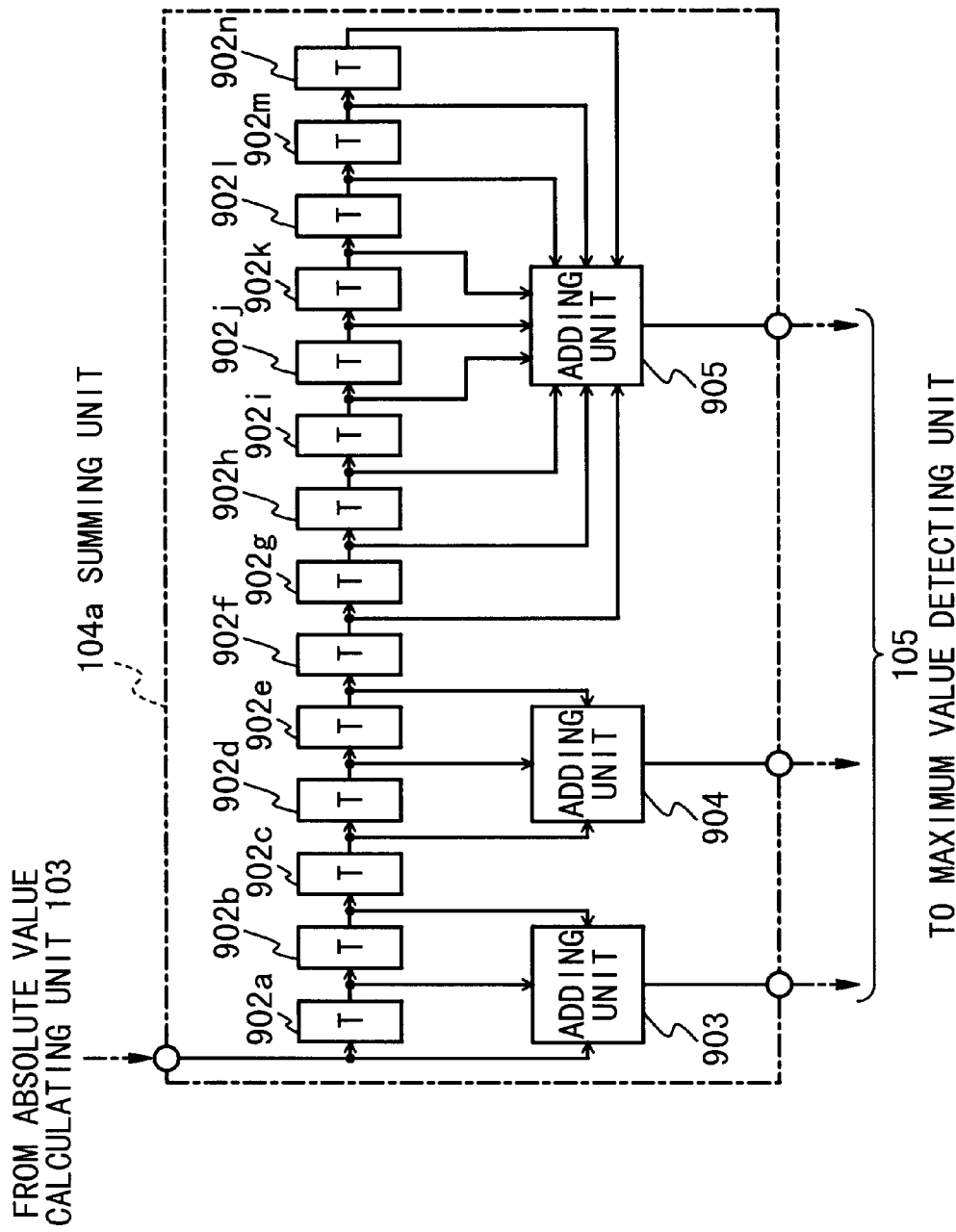
FIG. 14 is a block diagram illustrating the detailed structure of the summing unit of the delayed decision feedback sequence estimating and receiving apparatus according to the second embodiment of the present invention.

FIG. 14 is a schematic block diagram for illustrating the detailed structure of the summing unit 104a of FIG. 13. Referring to FIG. 14, the summing unit 104a is composed of delay elements 402a, 402b, 402c, 402d, 402e, 402f, 402g, 402h, 402i, 402j, 402k, 402l, 402m, and 402n. These delay elements connected in series delay the absolute value signal supplied from the absolute value calculating unit 103 every one symbol.

In addition, the summing unit 104a is composed of an adding unit 903, an adding unit 904, and an adding unit 905. The adding unit 903 adds the absolute value signal supplied from the absolute value calculating unit 103 to the delayed signals supplied from the delay elements 402a and 402b to thereby output a maximum likelihood sequence estimation region power summation value. The adding unit 904 adds the delayed signals for the next three symbols to each other to thereby output as a decision feedback equalization region power summation value. The adding unit 905 adds the delayed signals for the nine remaining symbols to each other to thereby output an out-of-estimation region power summation value.

Figure 15:
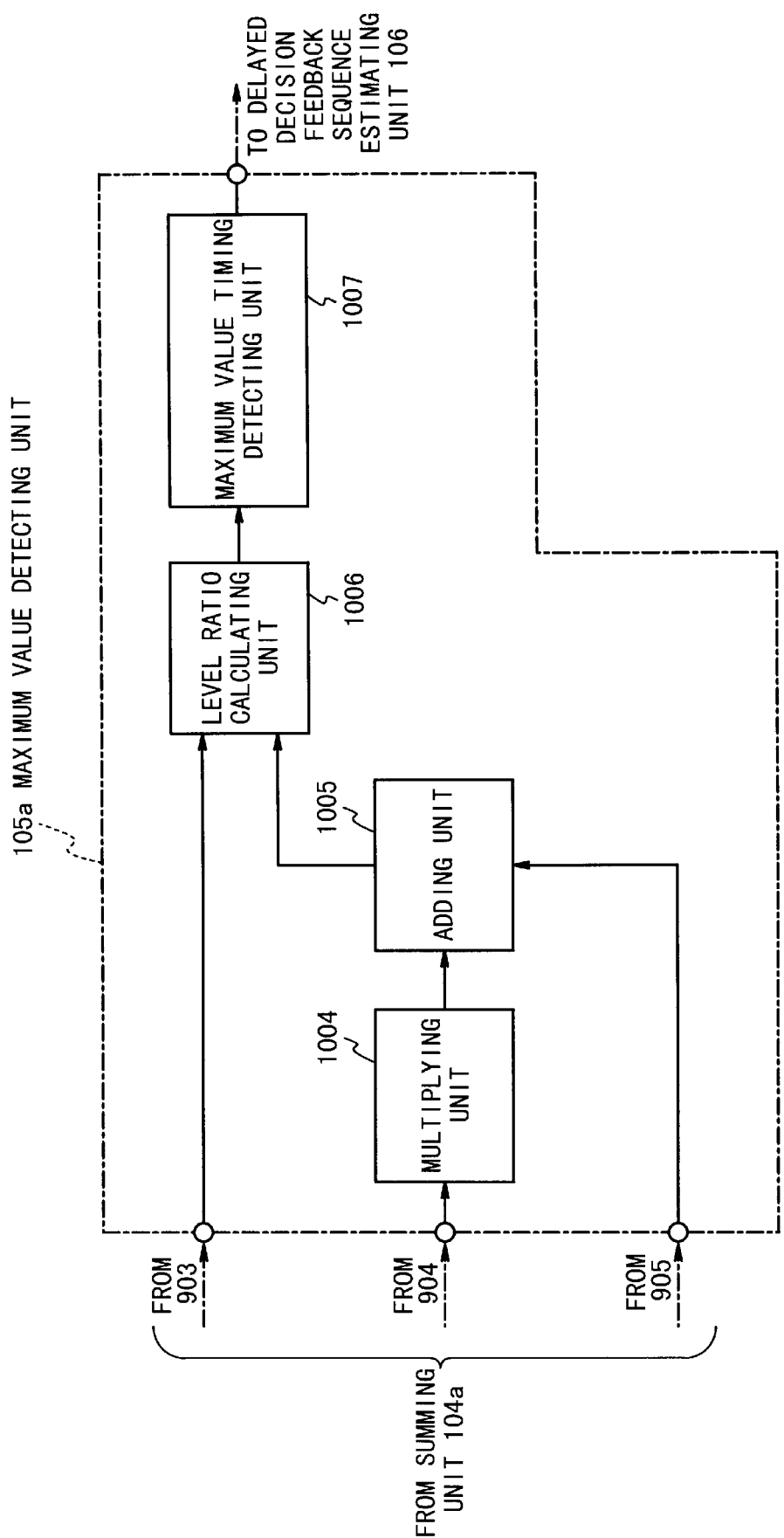
FIG. 15 is a block diagram illustrating the detailed structure of the maximum value detecting unit of the delayed decision feedback sequence estimating and receiving apparatus according to the second embodiment of the present invention.

FIG. 15 is a schematic block diagram for illustrating the detailed structure of a maximum value detecting unit 105a used in the second embodiment. In FIG. 15, the maximum value detecting unit 105a is composed of a multiplying unit 1004, an adding unit 1005, a level ratio calculating 1006, and a maximum value timing detecting unit 1007.

The multiplying unit 1004 multiplies the decision feedback equalization region power summation value by a coefficient "α" to thereby output the multiplied decision feedback equalization region power summation value. The adding unit 1005 adds the output signal supplied from the multiplying unit 1004 to the out-of-estimation region power summation value to thereby output the added summation value. The level ratio calculating unit 1006 calculates a ratio of the maximum likelihood sequence estimation region power summation value to the output from the adding unit 1005. The maximum value timing detecting unit 1007 detects a timing of the maximum value from the comparison result of the level ratio calculating unit 1006.

FIG. 16 is a schematic block diagram for illustrating the detailed structure of the maximum value timing detecting unit 1007 shown in FIG. 15. This maximum value timing detecting unit 1007 is composed of a 3-bit shifter 1102, a 6-bit shifter 1103, and an adding unit 1104.

The 3-bit shifter 1102 reduces a ratio value of the maximum likelihood sequence estimation region power summation value to the output value of the adding unit 1005, which is calculated by the level ratio calculating unit 1006, to ⅛ of the ratio. The 6-bit shifter 1103 reduces a ratio of the maximum likelihood sequence estimation region power summation value to the output value of the adding unit 1005, which is calculated in the level ratio calculating unit 1006, to ¹⁄₆₄ of the ratio. The adding unit 1104 adds the output signal supplied from the 3-bit shifter 1102 to the output signal supplied from the 6-bit shifter 1103.

Next, operations of the delayed decision feedback sequence estimating and receiving apparatus according to the second embodiment will now be described.

In FIG. 5, when a training signal is received, the correlation calculation between the input signal and the 15-bit M sequence PN code is carried out by the transmission channel characteristic detecting unit 102. In this correlation calculation, the above-explained impulse response shown in FIG. 2 is outputted as a time sequence signal for 15 symbols. The absolute values of pulses of the time sequence signal for the impulse response are approximated by the absolute value calculating unit 103. The absolute value of the complex number is approximated by the absolute value calculating unit 103 shown in FIG. 7. The output signals supplied from this absolute value calculating unit 103 are supplied to the summing unit 104. Thus, the output signals for 15 symbols are continuously acquired.

In the summing unit 104a of FIG. 13, the maximum likelihood estimation region power summing unit 802 calculates the summation values of absolute values of pulses of the impulse response for the maximum likelihood sequence estimation region in FIG. 2. The out-of-estimation region power summing unit 804 calculates the summation values of the absolute values of the pulses of the impulse response for the region other than the maximum likelihood sequence estimation region and the decision feedback equalization region.

In the summing unit 104a of FIG. 14, the absolute value signal supplied from the absolute value calculating unit 103 is supplied to the delay element 902a. Then, the absolute value signal is delayed every one symbol, so that the delayed signal is shifted from the delay element 902b to the delay element 902n. The absolute value signal supplied from the absolute value calculating unit 103, and the delay signals supplied from the delay elements 902a and 902b are supplied to the adding unit 903 to be added to each other. The added signal is outputted as a maximum likelihood sequence estimation region power summation value. The signals for the next three symbols are supplied into the adding unit 904 to be added to each other. Then, the added signal is outputted as a decision feedback equalization region power summation value from this adding unit 904. The signals for the remaining nine symbols are added to each other by the adding unit 905. Thus, the added signal is outputted as an out-of-estimation region power summation value. As the output signal of the summing unit 104a, the summation values for 15 times are outputted to be supplied to the maximum value detecting unit 105a shown in FIG. 15.

The maximum value detecting unit 105a detects that a maximum value is accomplished at what timing as an estimation timing of the delayed decision feedback sequence estimating unit 106 among the ratios for 15 symbols. In this maximum timing detecting unit 1007 shown in FIG. 15, 0 is inputted as an initial value into the register 604, and 0 is set as an initial value into the counter 605, as in the unit shown in FIG. 10. The maximum value detecting unit 105a acquires the maximum likelihood sequence estimation region power summation value, the decision feedback equalization region power summation value, and the out-of-estimation region power summation value, whereas the multiplier 1004 multiplies the decision feedback equalization region power summation value by the coefficient "α".

This coefficient value of "α" may be determined by the hardware structure of the delayed decision feedback sequence estimating unit 106. The output signal supplied from the multiplying unit 1004 is added to the out-of-estimation region power summation value by the adding unit 1005, and then the added signal is outputted to the level ratio calculating unit 1006. This level ratio calculating unit 1006 calculates a ratio of the maximum likelihood sequence estimation region power summation value to the output value of the adding unit 1005.

The comparing unit 602 compares the value stored in the register shown in FIG. 10 with the summation value from the summing unit. When the summation value is equal to or larger than the stored value, the summation value is selected by the selecting unit 603, and then the selected value is supplied as a maximum value into the register 604. At this time, the count value of the counter 606 is written into the register 605.

When the summation value is smaller than he stored value, the selecting unit 603 selects the stored value supplied from the register 604. As a result, the value of this register 604 is saved as it is. The output signal of the counter 606 is not written into the register 605, but the register 605 holds the value as it is. The calculation is repeatedly performed 15 times, so that the timing indicative of the optimum signal estimation region for the impulse response in the delayed decision feedback sequence estimating unit 106 is stored into the register 605. The value of the register 605 is outputted to the delayed decision feedback sequence estimating unit 106.

In the delayed decision feedback sequence estimating unit 106, the impulse response as shown in FIG. 2 is inputted for 15 symbols from the transmission channel characteristic detecting unit 102. Also, a symbol indicative of a time "T" is supplied as a timing symbol from the maximum value detecting unit 105. As a result, in FIG. 2, pulse values of impulse response appearing at times T, 2T, and 3T are used for estimation of the maximum likelihood sequence. Further, pulse values of the impulse response appearing at times 4T, 5T, and 6T are used as the decision feedback equalization.

In the conventional sequence estimating system, when the transmission channel characteristic is indicated as the impulse response as shown in FIG. 12, the regions defined from the times T to the time 3T is used as the maximum likelihood sequence estimation region, whereas the region defined from the times 4T to the time 6T is used as the decision feedback equalization region. In the second embodiment, as shown in FIG. 12, the timing shifted by two symbol is determined as optimum timing.

In accordance with the conventional sequence estimation method, assuming now that the power component of the maximum likelihood sequence estimation region is "P", the power component of the decision feedback equalization region is "Q", and the power component of other remaining regions is "R", a maximum point of (P+Q)/R is selected as the optimum timing. To the contrary, in accordance with the second embodiment of the present invention, another maximum point of P/(R+αQ) is selected as the optimum timing. This is because the power component Q is canceled by a decision feedback equalizing calculation unit of the delayed decision feedback sequence estimating unit 106 under optimum condition, so that neither the improvement of the estimation characteristic occurs, nor the deterioration of the estimation characteristic occurs.

However, in the actual hardware, since there is the quantization error in the calculation, the power component Q cannot be completely canceled during the decision feedback equalizing calculation of the delayed decision feedback sequence estimating unit 106. As a result, the power component is left as distortion. When the power component Q becomes larger than the power component P of the maximum likelihood sequence estimation region, the adverse influence caused by this distortion is increased. As a consequence, in order to calculate the maximum likelihood sequence estimation region, the power component Q must also be considered in addition to the power component R as the deterioration factor. The value of the coefficient "α" may be determined based on the calculation scale and the number of quantization bits in the delayed decision feedback sequence estimating unit 106. Even when the value of this coefficient "α" is slightly varied, there is no large adverse influence in the estimation capability of the delayed decision feedback sequence estimating unit 106. As a result, the process operations by the multiplying unit 1004 can be realized without use of a multiplying unit with a large-scaled calculation.

FIG. 16 schematically indicates a structure of the maximum value timing detecting unit 1007 capable of producing $\frac{1}{7}$ as the value of the coefficient "α". In FIG. 16, the input signal is supplied to the 3-bit shifter 1102 and the 6-bit shifter 1103. The signal shifted by 3 bit, i.e., reduced to $\frac{1}{8}$ is outputted from the 3-bit shifter 1102, whereas the signal shifted by 6 bits, i.e., reduced to $\frac{1}{64}$ is outputted from the 6-bit shifter 1103. These bit-shifted signals are added to each other by the adding unit 1104, so that the input signal is finally reduced by approximately $\frac{1}{7}$, and the $\frac{1}{7}$-reduced signal is outputted from this adding unit 1104. This is made based on "$\frac{1}{8}+\frac{1}{64}\approx\frac{1}{7}y$".

As described above, the process operation by the multiplying unit 1004 may be realized by simply combining these bit shifters and the adding unit.

As previously described in detail, in accordance with the delayed decision feedback sequence estimating and receiving apparatus of the present invention, a timing at which the highest estimation capability can be realized is detected by a small-scaled calculation operation by executing the delayed decision feedback sequence estimation based upon the power component of the maximum likelihood sequence estimation region, the power component of the decision feedback equalization region, and also the power component of the out-of-estimation region.

As a result, when a region from which the optimum signal can be estimated is determined from the impulse response for the transmission channel, the optimum estimation region can be correctly and reliably found out by using the simple algorithm without employing the large-scaled calculation method such as multiplication. Therefore, the delayed decision feedback sequence estimating and receiving apparatus can be operated under low power consumption and with having the simple circuit arrangement, so that the entire apparatus can be made compact and in light weight.

What is claimed is:

1. A delayed decision feedback sequence estimating apparatus comprising:

a transmission channel characteristic detecting unit for detecting a transmission channel characteristic for a training signal;

a timing detecting unit for detecting when there is obtained a maximum of ratios of a summation value of absolute values of amplitude components of said transmission channel characteristic for a maximum likelihood sequence estimation region to an addition of a value obtained by multiplying, by a predetermined value, a summation value of absolute values of amplitude components of said transmission channel characteristic for a decision feedback equalization region and a summation value of absolute values of amplitude components of said transmission channel characteristic for a region other than said maximum likelihood sequence estimation region and said decision feedback equalization region, as an out-of-estimation region, to generate a timing signal; and a delayed decision feedback sequence estimating unit for executing a maximum likelihood sequence estimation of an inputted reception signal with a transmission distortion based on said transmission channel characteristic detected by said transmission channel characteristic detecting unit and said timing signal outputted from said timing detecting unit to output a transmission signal.

2. A delayed decision feedback sequence estimating apparatus according to claim 1, wherein said timing detecting unit comprises:

an absolute value calculating unit for calculating said absolute values of said amplitude components of said transmission channel characteristic detected by said transmission channel characteristic detecting unit;

a summing unit for calculating said summation values of the absolute values of the amplitude components calculated by the absolute value calculating unit; and a maximum value detecting unit for detecting when there is obtained a maximum of said ratios of said summation value of said absolute values of said amplitude components of said transmission channel characteristic for said maximum likelihood sequence estimation region to the addition of a value obtained by multiplying, by said predetermined value, the summation value of said absolute values of said amplitude components of said transmission channel characteristic for said decision feedback equalization region and said summation value of said absolute values of said amplitude components of said transmission channel characteristic for said out-of-estimation region, to generate a timing signal.

3. A delayed decision feedback sequence estimating apparatus according to claim 2, wherein said absolute value calculating unit comprises:

a first absolute value calculating unit for calculating an absolute value of a real part of each of said amplitude components of said transmission channel characteristic;

a second absolute value calculating unit for calculating an absolute value of an imaginary part of each of said amplitude components of said transmission channel characteristic;

a comparing unit for comparing the absolute value of the real part supplied from said first absolute value calculating unit with the absolute value of the imaginary part supplied from said second absolute value calculating unit to output a comparison resultant signal;

a switching unit responsive to the comparison signal, for respectively outputting the absolute value of the real part and the absolute value of the imaginary part as first and second absolute values, when the absolute value of the real part is equal to or larger than the absolute value of the imaginary part, and for respectively outputting the absolute value of the real part and the absolute value of the imaginary part as the second and first absolute values, when the absolute value of the real part is smaller than the absolute value of the imaginary part;

a multiplying unit for multiplying the second absolute value by a predetermined value to produce a multiplied absolute value; and an adding unit for adding the first absolute value and the multiplied absolute value to output an added absolute value as said absolute value of said amplitude component.

4. A delayed decision feedback sequence estimating apparatus according to claim 2, wherein said summing unit comprises:

a first summing unit for calculating said summation values of said absolute values of said amplitude components of said transmission channel characteristic for said maximum likelihood sequence estimation region; and a second summing unit for calculating said summation values of said absolute values of said amplitude components of said transmission channel characteristic for said out-of-estimation region.

5. A delayed decision feedback sequence estimating apparatus according to claim 2, wherein said predetermined value is 0, and wherein said summing unit comprises:

a plurality of delay elements connected in series, for delaying each of the absolute values supplied from said absolute value calculating unit for every symbol;

a first adding unit for adding said absolute values supplied from the absolute value calculating unit and the delayed absolute values supplied from said delay elements corresponding to said maximum likelihood sequence estimation region to output said summation value for said maximum likelihood sequence estimation region; and a second adding unit for adding the delayed absolute values from ones of said delay elements corresponding to said out-of-estimation region to output said summation value for said out-of-estimation region.

6. A delayed decision feedback sequence estimating apparatus according to claim 2, wherein said predetermined value is 0, and wherein said maximum value detecting unit comprises:

a level ratio detecting unit for detecting a ratio of said summation value for said maximum likelihood sequence estimation region to said summation value for said out-of-estimation region; and a maximum value timing detecting unit for detecting when there is obtained said maximum value of said ratios of said summation value for said maximum likelihood sequence estimation region to said summation value for said out-of-estimation region to generate said timing signal.

7. A delayed decision feedback sequence estimating apparatus according to claim 6, wherein said level ratio detecting unit comprises:

a level shifter for reducing a number of bits of each of said summation value for said maximum likelihood sequence estimation region and said summation value for said out-of-estimation region which are supplied from said summing unit; and a ROM for outputting said ratio of said maximum likelihood sequence estimation region summation value to said out-of-estimation region summation value in response to the reduced maximum likelihood sequence estimation region summation value and the reduced out-of-estimation region summation value.

8. A delayed decision feedback sequence estimating apparatus according to claim 6, wherein said maximum value timing detecting unit comprises:

a first register for storing said ratio outputted from said level ratio detecting unit;

a comparing unit for comparing said ratio supplied from said level ratio detecting unit with said ratio supplied from said first register;

a selecting unit for selecting said ratio supplied from said level ratio detecting unit as a maximum value, when said ratio supplied from said level ratio detecting unit is equal to or larger than said ratio supplied from said first register, for selecting said ratio supplied from said first register, when said ratio supplied from said level ratio detecting unit is smaller than said ratio supplied from said first register, and for storing the selected ratio in said first register;

a counter for counting a number of ratios supplied from said level ratio detecting unit; and a second register for storing the count value from said counter in response to an output signal from said comparing unit to output said timing signal to said delayed decision feedback sequence estimating unit.

9. A delayed decision feedback sequence estimating apparatus according to claim 2, wherein said predetermined value is not 0, and wherein said summing unit comprises:

a first summing unit for calculating said summation values of said absolute values of said amplitude components of said transmission channel characteristic for said maximum likelihood sequence estimation region;

a second summing unit for calculating said summation values of said absolute values of said amplitude components of said transmission channel characteristic for said decision feedback equalization region; and a third summing unit for calculating said summation value of said absolute values of said amplitude components of said transmission channel characteristic for said out-of-estimation region.

10. A delayed decision feedback sequence estimating apparatus according to claim 2, wherein said summing unit comprises:

a plurality of delay elements connected in series, for each delaying each of the absolute values supplied from said absolute value calculating unit for every symbol;

a first adding unit for adding said absolute values supplied from the absolute value calculating unit and the delayed absolute values supplied from said delay elements corresponding to said maximum likelihood sequence estimation region to output said summation value for said maximum likelihood sequence estimation region;

a second adding unit for adding the delayed absolute values from ones of said delay elements corresponding to said decision feedback equalization region to output said summation value for said decision feedback equalization region; and a third adding unit for adding the delayed absolute values from ones of said delay elements corresponding to said out-of-estimation region to output said summation value for said out-of-estimation region.

11. A delayed decision feedback sequence estimating apparatus according to claim 10, wherein said maximum value detecting unit comprises:

a multiplying unit for multiplying said summation value for said decision feedback equalization region by said predetermined value to output said multiplied summation value;

an adding unit for adding the multiplied summation value supplied from said multiplying unit to said summation value for said out-of-estimation region to output an added summation value;

a level ratio calculating unit for calculating said ratio of said summation value for said maximum likelihood sequence estimation region to said added summation value from the adding unit;

a maximum value timing detecting unit for detecting when there is obtained said maximum value of said ratios from an output of said level ratio calculating unit to generate said timing signal.

12. A delayed decision feedback sequence estimating apparatus according to claim 11, wherein said maximum value timing detecting unit comprises:

a 3-bit shifter for reducing said ratio of said summation value for said maximum likelihood sequence estimation region to said added summation value outputted from said adding unit;

a 6-bit shifter for reducing said ratio of said summation value for said maximum likelihood sequence estimation region to said added summation value outputted from said adding unit; and an adding unit for adding an output supplied from said 3-bit shifter to an output supplied from said 6-bit shifter to generate said timing signal.

13. A delayed decision feedback sequence estimating apparatus according to claim 11, wherein said maximum value timing detecting unit comprises:

a first register for storing said ratio outputted from said level ratio detecting unit;

a comparing unit for comparing said ratio supplied from said level ratio detecting unit with said ratio supplied from said first register;

a selecting unit for selecting said ratio supplied from said level ratio detecting unit as a maximum value, when said ratio supplied from said level ratio detecting unit is equal to or larger than said ratio supplied from said first register, for selecting said ratio supplied from said first register, when said ratio supplied from said level ratio detecting unit is smaller than said ratio supplied from said first register, and for storing the selected ratio in said first register;

a counter for counting a number of ratios supplied from said level ratio detecting unit; and a second register for storing the count value from said counter in response to an output signal from said comparing unit to output said timing signal to said delayed decision feedback sequence estimating unit.

14. A delayed decision feedback sequence estimating apparatus according to claim 1, wherein said transmission distortion is frequency selective fading distortion in a multiple radio transmission system.

15. A delayed decision feedback sequence estimating apparatus according to claim 1, which is included in a digital mobile terminal system.

16. A delayed decision feedback sequence estimating apparatus according to claim 1, wherein said transmission channel characteristic is an impulse response.

17. A method of estimating a transmission signal from a reception signal in a delayed decision feedback sequence estimating apparatus comprising the steps of:

detecting a transmission channel characteristic for a training signal;

detecting when there is obtained a maximum of ratios of a summation value of absolute values of amplitude components of said transmission channel characteristic for a maximum likelihood sequence estimation region to an addition of a value obtained by multiplying, by a predetermined value, a summation value of absolute values of amplitude components of said transmission channel characteristic for a decision feedback equalization region and a power summation value of absolute values of amplitude components of said transmission channel characteristic for a region other than said maximum likelihood sequence estimation region and said decision feedback sequence equalization region, as an out-of-estimation region, to generate a timing signal; and executing an estimation of an inputted reception signal based on said transmission channel characteristic detected by said transmission channel characteristic detecting unit and said timing signal outputted from said timing detecting unit to output an estimation data.

18. A method according to claim 17, wherein said step of detecting when there is obtained a maximum of ratios includes:

calculating said absolute values of said amplitude components of said transmission channel characteristic detected by said transmission channel characteristic detecting unit;

calculating said summation values of the absolute values of the amplitude components calculated by the absolute value calculating unit; and detecting when it is obtained a maximum of said ratios of said summation value of said absolute values of said amplitude components of said transmission channel characteristic for said maximum likelihood sequence estimation region to the addition of a value obtained by multiplying, by said predetermined value, the summation value of said absolute values of said amplitude components of said transmission channel characteristic for said decision feedback equalization region and said summation value of said absolute values of said amplitude components of said transmission channel characteristic for said out-of-estimation region, to generate a timing signal.

* * * * *